Feb. 11, 1964   B. R. A. REFFELL   3,120,682
COLLAPSIBLE BUILDINGS

Filed May 9, 1962   2 Sheets-Sheet 1

INVENTOR
BRIAN R. A. REFFELL
BY *Ernest P. Joenen*
ATTORNEY

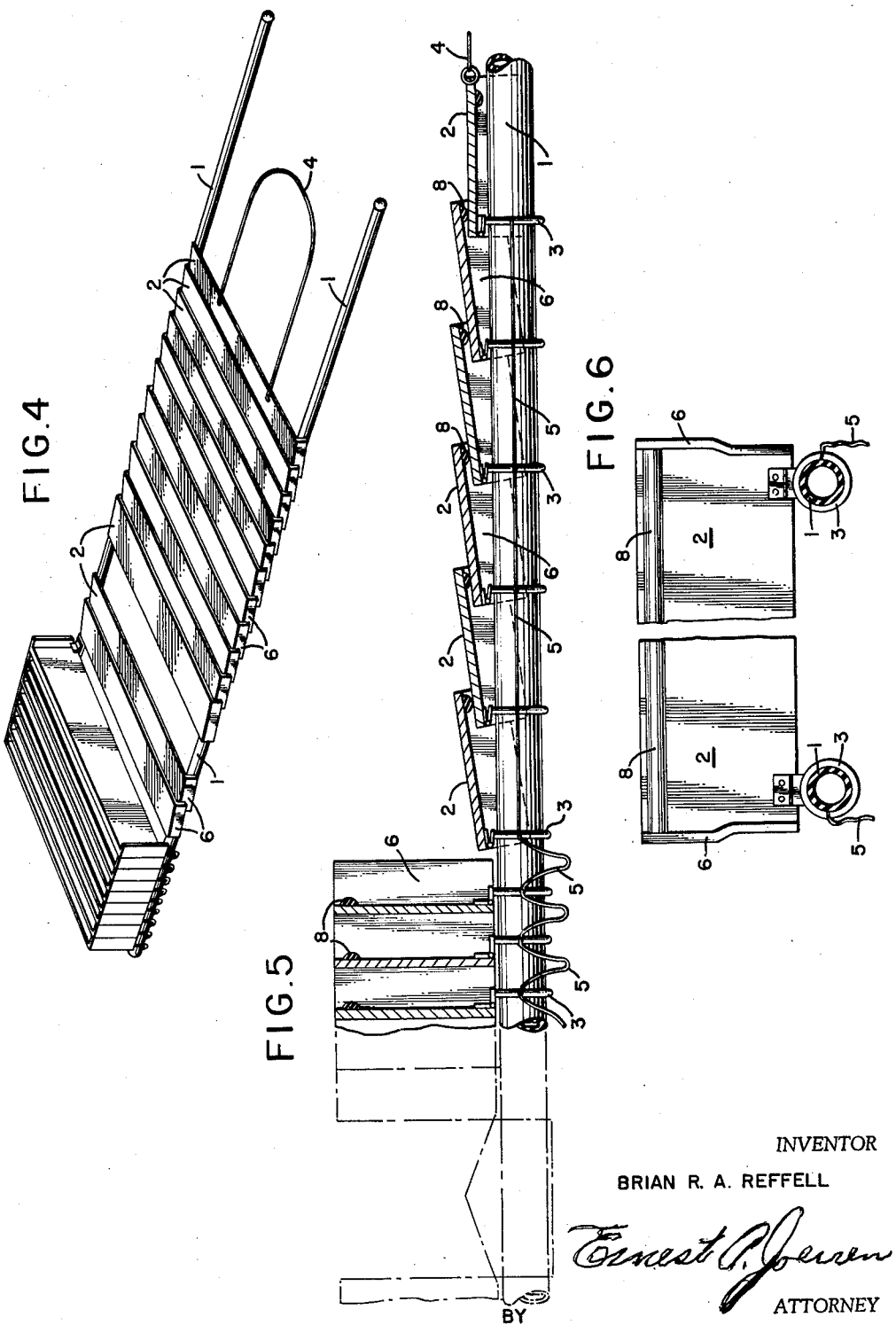

United States Patent Office 3,120,682
Patented Feb. 11, 1964

3,120,682
COLLAPSIBLE BUILDINGS
Brian R. A. Reffell, Hemel Hempstead, England, assignor to Specialties Development Corporation, Belleville, N.J., a corporation of New Jersey
Filed May 9, 1962, Ser. No. 193,545
4 Claims. (Cl. 20—1)

The present invention relates to collapsible buildings of the type which are designed to be erected by the inflation of a framework, formed of tubes.

Collapsible buildings are already known in which an inflatable tubular framework is provided, which is directly stitched or secured to fabric forming skin panels. In known inflatable framework buildings, the framework tubes are of quite light material and are not capable of holding high pressures. Such inflatable buildings are of rather limited size and strength and it is an object of the present invention to provide a construction by means of which larger and stronger buildings of the inflatable framework type may be provided.

The present invention depends upon the use in the structure of collapsible buildings of high pressure flexible hoses, that is to say, flexible hoses which may be inflated to a pressure of 40 lbs. per square inch and upwards. When such hoses are inflated to their operating pressure, they become relatively rigid and difficult to bend. If the two ends of a length of high pressure hose are connected to each other by some form of tie member, then, on inflation to the appropriate high pressure, the length of hose will assume the form of an arc of a circle, the extent of which will depend upon the relative length of the hose and the tie. Alternatively the high pressure hose can be made to assume such shape after partial inflation, then being made more rigid by completion of inflation. Such inflated hose can act as an arch and is capable of supporting quite substantial loads.

According to the present invention a collapsible building is characterised by at least one arched wall section which comprises at least two spaced flexible hoses, adapted to be inflated to a high pressure, say 40 lbs. per square inch or upwards, the flexible hoses being connected to each other by cross members which are movable longitudinally of the hoses when the hoses are in an uninflated condition. The inflation of the hoses, which causes some expansion of the hose material, is preferably effective to engage the cross members frictionally to hold them against movement lengthwise of the hoses.

Preferably a section for a collapsible and inflatable building comprises a pair of hoses which are connected by and held parallel to each other by means of a series of cross members in the form of slats, which are hinged to ring members which have an internal diameter slightly greater than the external diameter of the high pressure hoses in the uninflated condition and so may be slid along the hoses when in that condition. The size of the rings is such that when the inflated hoses expand they grip the rings to hold the slats against longitudinal movement on the hoses. The rings themselves are connected to each other by means of cords or wires, arranged so that when the cords are drawn out straight the rings are spaced along the two hoses at substantially equal intervals. The rings and their associated hinged slats may be gathered into a pack at one end of the pair of hoses, when the latter are disinflated, thus making the wall section very compact when in the collapsed condition.

In this preferred construction slat members are hinged to the rings, which may be drawn out to such spacing as is required to give the slats adequate overlapping to form a weather seal. The slat members may be made of light sheet material, such as marine plyboard or aluminium, and are hinged to the rings, which slide on the hose. In the inflated and extended condition of the section it will be appreciated that the slats may be brought into an overlapping position in relation to each other to form a continuous skin for the section, but in the disinflated condition the slats may be turned about their hinges so as to be laid up flat against each other in a pack in a position substantially at right angles to the length of the hoses, and in this condition the space occupied by a section is quite small. The rigid slats may, however, be replaced by fabric, which is stitched or otherwise fastened at intervals to cross tie bars connecting rings on the two hoses, and in such event there would be no necessity to provide cords or wires to connect the cross tie bars to one another.

The two ends of each of the high pressure hoses may be connected to each other by wires or cables, but preferably are fitted into two heavy flanged shoes, which may be securely fixed flat on the ground either before or after inflation, so that the inflated section assumes an approximately semicircular shape according to the distance by which the ends of the hose are spaced apart. The section may then be used as the side walls and roof of one bay of a complete building in the manner of the well-known Nissen hut. A complete building may include a number of such bays secured to each other side by side. In order to provide windows a number of adjacent slats of one or more of the sections may be formed of a transparent plastic material.

The end walls of a building of this kind may likewise be formed of a series of slats supported by high pressure hoses which are arranged as uprights and are preferably secured at their upper ends to the adjacent curved wall section hose. For the ends of the building the slats are, of course, of such length that when they are brought to their correct positions on the high pressure hoses their ends lie on the periphery of a semi-circle. The slats at the ends of the building are likewise hinged to members, which may be moved lengthwise of the hoses, as in the sections forming the semicircular bays of the building.

Some or all of the individual slats may be provided with a control lever connected to a control cable by means of which the slats may be partially raised to provide internal ventilation.

A door frame can be supported in between a pair of adjacent high pressure hoses in one end of the building.

The invention is hereinafter further described with reference to the accompanying drawings, wherein:

FIGURE 4 is a perspective view of one of the sections of the building in the collapsed state.

FIGURE 5 is a sectional view similar to FIGURE 4, but on a larger scale.

FIGURE 6 is a detail of the construction of the slats, and

Figure 1:
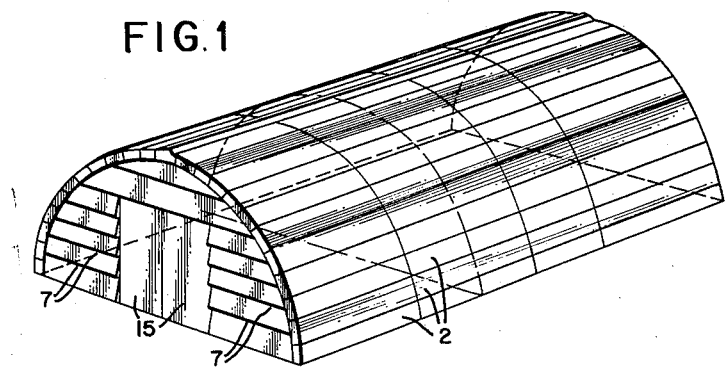
FIGURE 1 is a schematic perspective view of a building made in accordance with the invention.

Referring first to FIGURE 4, it will be seen that a wall section of the building in the collapsed state comprises a pair of spaced high pressure hoses 1, on which are mounted slats 2 which are hinged on rings 3 (see FIGURE 6) so that the slats may be stood on edge and packed close together as shown at the left-hand side of FIGURE 4. The slat 2 at one end of each section is provided with a draw cord 4 and the rings 3, to which the individual slats 2 are hinged, are connected to each other by cords 5 arranged so that when the cord 4 is pulled, the individual slats are brought to a correct spacing in relation to each other, so that they may overlap as shown in the right-hand side of FIGURE 5. The individual slats 2 may be made of marine plyboard or aluminium or other weather-resistant sheet material and may be provided with a downturned flange 6 at one or both ends, depending upon the manner in which the wall section is to be used in constructing a building. The downturned flanges 6 are for the purpose of overlapping slats 7 forming the end of the building so that commonly the slats will have no flanges. The end wall sections of buildinge employing more than one wall section will have flanges at one side, whilst the slats will have flanges at both sides where the building is to employ only one wall section. As will be seen from FIGURE 5, the slats 2 are provided with rubber or like material sealing members 8 for forming a weatherproof seal with adjacent slats. It will be appreciated that where the slats are provided with flanges 6, the free edge of a slat must be rather wider than the hinged edge, as illustrated in FIGURE 6, so as to permit the free edge of one slat to fit over the hinged edge of the slat below it.

As already explained, the hoses 1, although adapted to withstand high pressures, to dilate when they are inflated to such pressures, and use of this characteristic is made to secure the rings 3 in position. The rings 3 are of such size that they can be moved lengthwise along the high pressure hoses 1 when in the uninflated condition. High pressure hoses do not collapse when uninflated and retain a substantially circular profile. When inflated to the operating pressure, however, they dilate sufficiently to grip the rings 3 and thus hold them against longitudinal movement.

The means for inflating the high pressure hoses 1 is not shown, but they would preferably be inflated by release of gas from a storage cylinder so that the building could be erected without the aid of special inflation equipment.

As will have been appreciated from earlier description, the building depends upon the use of inflated high pressure hose to act as an arch. As already explained, an inflated high pressure hose tends to straighten itself out, and it is therefore necessary to secure the ends of the high pressure hose in relation to each other at a distance less than the length of the hose to enable it to be used in the desired manner. Although the ends of the hoses 1 could be secured to each other by a length of cable so as to make them assume the desired arcuate shape on inflation, the simplest way is to provide flanged shoes 9 (see FIGURE 2) on the ends of the hoses 1. These shoes are secured to the ground by spikes and thus hold the ends of the hoses at a predetermined spaced relation. To erect one wall section the rings and slats are preferably drawn out to the operative position with the hoses 1 in a completely uninflated condition lying flat on the ground. The hoses 1 are then partially inflated so as to impart some rigidifying effect to them. The shoes 9 are then spiked down at the desired distance apart and at such time the wall section will assume the shape illustrated in FIGURES 2 and 3. The rigidification of the hoses is then completed by final inflation to a pressure of 40 lbs. per square inch or more. The erection of a wall section can thus be completed in a very simple manner. For preference a space is provided in the wall section shown in FIGURE 4 at 10 for the insertion of a separate ridge section member 11 when the slats of the wall section are being drawn out from the fully collapsed condition.

Figure 7:
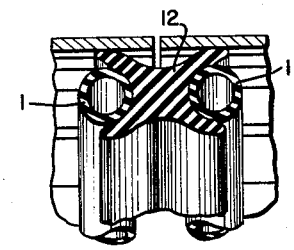
FIGURE 7 is a detail of the sealing means employed between adjacent sections.
Figure 2:
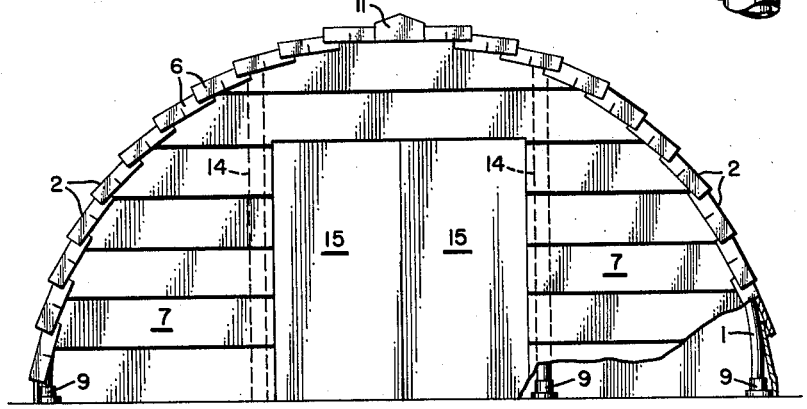
FIGURE 2 is an end view of a building.

A weather seal is preferably provided between adjacent wall sections by inserting an extruded rubber section 12 between adjacent hoses 1 of adjacent sections during the erection of the building (see FIGURE 7). The building may be completed by the use of ends of any desired shape or construction. One method of constructing the end of the building is shown in FIGURE 2, where the end is composed of a number of slats 7 supported by straight upright hoses 14, which are clamped to the hoses 1 of the adjacent wall section at their upper ends. The foot end of the hoses 14 are held in shoes 9. The outer ends of the slats 7 are secured to the rings 3 of the wall section. This is one convenient way of constructing the end of the building, which is also provided with doors 15 which use the upright hoses 14 as doorposts.

Figure 3:
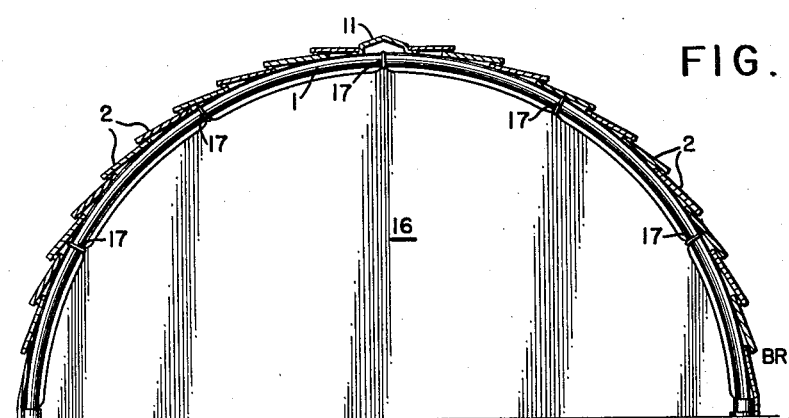
FIGURE 3 is an internal view of one of the sections of the building, showing an internal partition.

An alternative construction is shown in FIGURE 3, in which there is shown a canvas partition 16, secured by snap rings 17 onto a hose. This construction can also be used for the ends of a building, in which case windows of transparent plastic material would also be included and likewise a canvas door flap.

After the building has been erected, the slats 2 of the wall sections are preferably held down by means of cables which are passed over the building and pegged to the ground close to the foot of the wall sections at both sides of the building. This prevents the slats from becoming displaced by the wind.

I claim:

1. A collapsible building including at least one arched wall section comprising at least two spaced flexible hoses adapted to be inflated to a high pressure, members mounted on and slidable longitudinally of said hoses in the uninflated condition of said hoses, crosswise extending slats, and hinge means for connecting each of said slats at one edge to one of said members on each of said hoses, whereby said hoses are connected to each other by said slats.

2. A collapsible building according to claim 1, wherein said members are dimensioned so as to be clamped against longitudinal movement by the dilation of said hoses on inflation to a high pressure.

3. A collapsible building according to claim 1, wherein a cord is connected to said members at lengthwise intervals of somewhat lesser extent than the breadth of said slats, so that said slats may be drawn out from a packed condition in which said slats lie substantially perpendicular to said hoses to a condition in which the free edge of one slat overlaps the hinged edge of an adjacent slat.

4. A collapsible building according to claim 3, wherein a draw cord is connected to said slat at one end of the section.

References Cited in the file of this patent

UNITED STATES PATENTS

| 2,642,162 | Tobias | June 16, 1953 |
| 2,698,020 | Phane | Dec. 28, 1954 |
| 2,955,606 | Walker | Oct. 11, 1960 |

FOREIGN PATENTS

| 358,094 | Great Britain | 1931 |

OTHER REFERENCES

Popular Mechanics, December 1956, page 155.